Patented Apr. 2, 1940

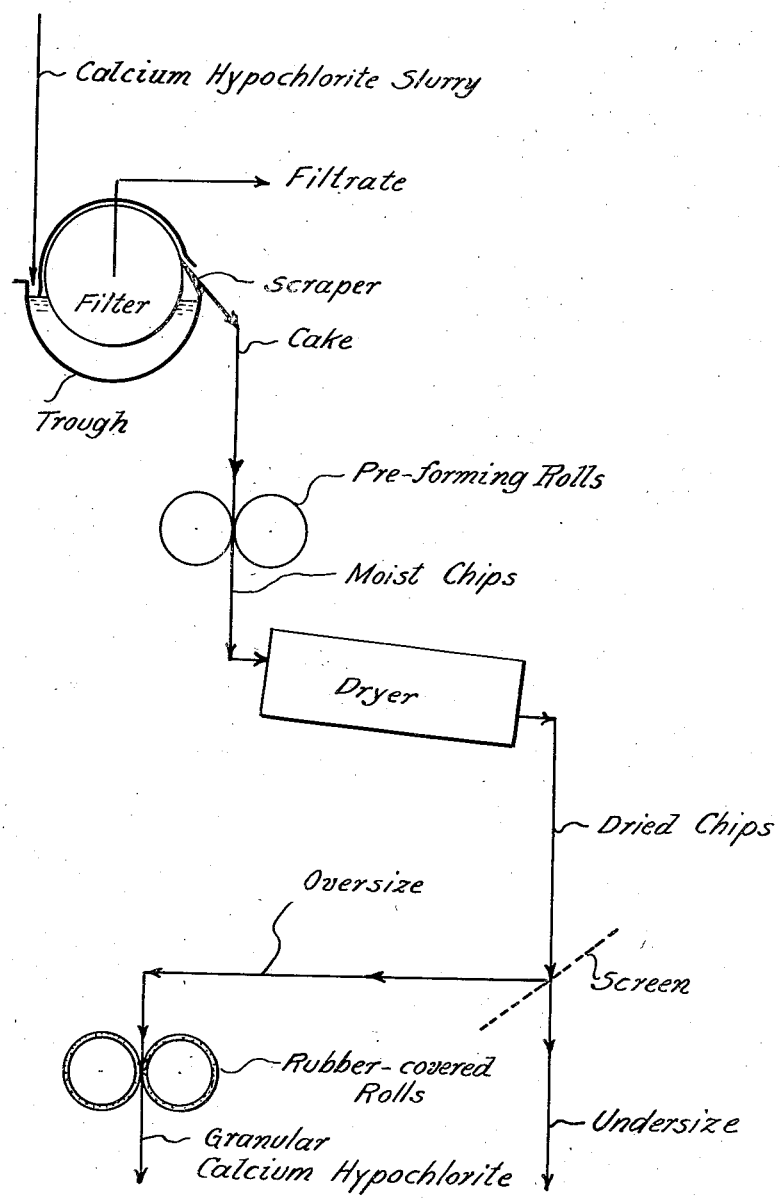

2,195,754

UNITED STATES PATENT OFFICE 2,195,754

CRUSHING SOFT HETEROGENEOUS MATERIAL

Homer Louis Robson, Lewiston, and Harold Dorman Kaufmann, Niagara Falls, N. Y., assignors to The Mathieson Alkali Works, Inc., New York, N. Y., a corporation of Virginia Application July 22, 1937, Serial No. 155,016

11 Claims. (Cl. 83—94)

This invention relates to crushing non-homogeneous and relatively soft bodies and particularly to the crushing of dried pieces of calcium hypochlorite and the like containing a substantial proportion of voids.

According to a recent practice calcium hypochlorite is obtained in hydrated form as a slurry. When this slurry is filtered to produce a cake that in turn is dried there results a product comprising chips or flakes of substantially dehydrated calcium hypochlorite containing a relatively large percentage of small voids or air spaces. To place this material in marketable form it is desirable to crush the pieces to a granular form having a maximum size not to exceed about 20 mesh and containing as little as possible of particles minus 100 mesh in size.

The presence in the crushed product of more than about 10% by weight of particles smaller than 100 mesh is deleterious because it makes for much dusting during the handling of the dried product and tends to retard the penetration of liquid into masses of the product, thus retarding its solution. Moreover, the presence of considerable proportions of fines (say 25 to 40% by weight of material minus 100 mesh in size) tends toward the formation of lumps when the product is added to water, due to reaction between calcium hypochlorite and water to form hydrates, etc. Furthermore, the presence of excessive fines causes the product to pack when shipped in drums.

Efforts to crush the dehydrated chips with customary crushing means resulted in the formation of excessive quantities of fines. Crushing between rolls having nonyielding surfaces (for example, steel) causes the chips to cake, that is, to form into relatively large and solid plates which are not granular and do not satisfy market conditions.

The use of hammer mills, grinding plates, etc., for comminuting the chips produces an excessive quantity of fines—greatly in excess of the 10% of minus 100 mesh particles which can be tolerated. We have found, however, that the dehydrated calcium hypochlorite chips may be crushed to proper size between yielding surfaces without the production of substantial quantities of fines and without substantial caking.

Our investigations have shown also that crushing between yielding surfaces to avoid the production of excessive fines is applicable to many materials which are analogous in physical structure to the dehydrated chips of calcium hypochlorite. In general, material to be crushed between yielding surfaces should be relatively soft, structurally weak and non-homogeneous. This non-homogeneity may be due to fractures, to voids, to planes of varying density formed while the material is wet and in a somewhat plastic state, or to the inclusion of small foreign particles. Materials of this character possess surfaces along which slippage or splitting will occur when the particle is placed under stress. In the case of the dehydrated calcium hypochlorite chips the non-homogeneity results from the evolution of water, leaving voids.

From the foregoing it will be clear that our invention is not limited to the crushing of dehydrated calcium hypochlorite, but may be utilized to form a coarsely granular product from many soft materials. For example, coarsely granular material may be formed from soft clays and the like by forming the clay into a moist plastic mass, drying or burning the mass to produce small voids throughout, and then crushing it between yielding surfaces.

Accordingly, our invention comprises the production of granular material from relatively soft, structurally weak, and non-homogeneous particles (preferably containing voids or gas spaces) by crushing said particles between continuous yielding surfaces. Our invention contemplates the improvement in producing a granular product from soft material which comprises forming the material into pieces containing substantial proportions of voids and crushing the pieces between yielding surfaces. These and other features of our invention will be made clear in the following detailed description taken in conjunction with the single figure which illustrates a presently preferred practice of our invention for producing granular calcium hypochlorite.

Referring now to the figure, it will be seen that an aqueous calcium hypochlorite slurry containing a large proportion of water, but with the bulk of the calcium hypochlorite in solid form, is passed into a trough of a drum-type filter of well-known form. Liquid accompanying the solid calcium hypochlorite is sucked into the drum leaving a cake of moist calcium hypochlorite adhering to the drum surface. As the drum revolves the cake is removed by a scraper. The removed cake is in the form of soft pieces which pass through pre-forming rolls (which need not have yielding surfaces) and emerge therefrom as slightly compressed crinkled sheets or curved flakes or chips. The latter are introduced into a dryer (for example a rotary vacuum dryer).

In the drier the flakes or chips are thoroughly dehydrated and pass therefrom onto a screen, which removes the undersize (minus 20 mesh). The oversize dried, curved chips and aggregates of curved chips resulting from moist chips cohering to one another during the drying operation are passed through a pair of crushing rolls of conventional design, except that the crushing surfaces of these rolls are covered with a yielding material and preferably resilient material, such as rubber. The crushing rolls should be so set as to bear against each other when no material is being passed between them. This provides for a pressure sufficient to break the chips but insufficient to produce a substantial quantity of fines.

After crushing, the calcium hypochlorite is in granular form, and may be packed directly into drums for shipment. It contains less than 10% of particles of minus 100 mesh, does not tend to pack, remains free flowing and substantially dustless during shipment, dissolves readily in water, and does not form lumps when added to water. The dried chips contain large numbers of air spaces, and it is the presence of these air spaces which causes the chips to compress and flatten into cakes instead of breaking apart when they are passed between steel rolls or other non-yielding surfaces.

Dried sheets or chips .02 inch thick were crushed in rubber rolls so that all passed 20-mesh (diameter of opening .033 inch) with a production of only 6% of particles minus 100 mesh. Sheets which were .03 inch thick were crushed to pass 14-mesh (.046 inch opening) with a similar small production of minus 100 mesh material. When chips .03 inch in thickness were crushed with rubber rolls to pass 20 mesh, from 10 to 12% of minus 100 mesh material was produced. Inasmuch as 10% of minus 100 mesh material can be tolerated in the final granular product, it is clear that the practice outlined above is entirely satisfactory from a commercial standpoint.

Crushing the pieces between rubber rolls causes them to break cleanly with no "pancaking" effect, i. e., without the formation of merely mashed aggregates. Where the voids (i. e. the air cells) comprise only a small amount of the volume of the chip (e. g. 5% or less) the "pancaking" effect when crushing between non-yielding surfaces is not pronounced. However, when the voids comprise a large portion of the volume of the chips, say 20% or more, the "pancaking" effect between non-yielding surfaces becomes great. Inasmuch as the dehydrated calcium hypochlorite chips produced as described above contain at least 20% by volume of voids, the use of non-yielding crushing surfaces, particularly rubber covered rolls, is highly desirable, and the only means known to us for obtaining a truly satisfactory product.

The rolls employed may be iron cylinders having roughened surfaces which are coated with rubber. The thickness of the rubber coating on the iron roll may vary from ⅛ inch to 1 inch. However, we have found that a thickness of ¼ to ½ inch to be most satisfactory.

The hardness of the rubber coating on the rolls may vary widely. We have obtained best results with rubber having a "durometer test" between 40 and 70 units; but the optimum hardness of the roll surface will depend upon the hardness of the chips and the volume of voids which they contain.

For the dehydrated hypochlorite chips of say .02 inch in thickness, we have found that the rubber covered rolls should have relatively small diameter (i. e., from 2 to 4 inches). Optimum results were obtained with rubber-covered rolls that were 2½ inches in outside diameter. Rubber covered rolls of large diameter may be employed and will give fair results, although the proportion of fines in the crushed material will tend to be high because there is more rubbing of the chips against each other upon passing through the rolls. In other words, rubber covered rolls of large diameter tend to have greater contact with each other than rolls of small diameter and consequently pinch the chips during a greater interval. In general it may be said that the diameter of the rolls should be less than 150 times the thickness of the chips to be crushed, and preferably less than 100 times the thickness of the chips.

The rolls should revolve toward each other, i. e., one should turn clockwise while the other turns counterclockwise. The speed of revolution may vary widely, but we have found that a speed of about 100 R. P. M. is optimum when crushing chips about .02 inch thick with rolls having an outside diameter of 2½ inches and a rubber covering ⅜ inch in thickness. Thus, the rolls rotate at substantially the same peripheral speed.

We claim:
1. The improvement in producing granular calcium hypochlorite which comprises collecting a film of the moist hypochlorite on a surface, scraping the film from said surface and compressing it between curved surfaces to form moist curved flakes, drying the flakes to produce dehydrated curved chips having a considerable proportion of voids and crushing the dried chips between rolls having continuous surfaces of yieldable material rotating at substantially the same peripheral speed under a crushing pressure sufficient to break the chips but insufficient to produce a substantial quantity of fines.

2. The improvement in producing granular calcium hypochlorite which comprises forming moist calcium hypochlorite between curved surfaces into moist curved flakes from .01 inch to .03 inch thick, drying the flakes to produce curved chips and crushing the chips between continuous surfaces of yieldable material rotating at substantially the same peripheral speed under pressure sufficient to produce grains substantially all of which are minus 20 mesh but insufficient to produce a substantial quantity of fines.

3. The improvement in producing granular calcium hypochlorite which comprises forming moist calcium hypochlorite into moist curved flakes from .01 inch to .03 inch thick, drying the flakes to produce curved chips and crushing the chips between rolls having continuous surfaces of yieldable material and diameters ranging from 2 to 4 inches rotating at substantially the same peripheral speed under a pressure sufficient to produce grains substantially all of which are minus 20 mesh but insufficient to produce a substantial quantity of fines.

4. The improvement in forming a granular product from soft material which comprises forming the material into curved structurally weak and non-homogeneous chips and crushing the curved chips between continuous surfaces of yieldable material rotating at substantially the same peripheral speed under a crushing pressure sufficient to break the chips but insufficient to produce a substantial quantity of fines.

5. The improvement in forming a soft material into a granular product which comprises forming the material into a moist plastic mass, shaping the mass into curved flakes, drying the flakes to produce curved chips and aggregates of curved chips and crushing the dried chips and aggregates of curved chips between continuous surfaces of yieldable material rotating at substantially the same peripheral speed under a crushing pressure sufficient to break the chips but insufficient to produce a substantial quantity of fines.

6. The improvement in producing granular calcium hypochlorite which comprises forming the hypochlorite into dried curved chips and crushing the curved chips between continuous surfaces of yieldable material rotating at substantially the same peripheral speed under a crushing pressure sufficient to break the chips but insufficient to produce a substantial quantity of fines.

7. The method of producing granular calcium hypochlorite which comprises crushing substantially dry curved chips of calcium hypochlorite between surfaces of yieldable material rotating at substantially the same peripheral speed under a pressure sufficient to break the chips but insufficient to produce a substantial quantity of fines.

8. The method of producing granular calcium hypochlorite substantially free from fines which comprises crushing substantially dry curved chips of calcium hypochlorite between surfaces of yieldable material rotating at substantially the same peripheral speed under a crushing pressure sufficient to break the chips but insufficient to produce a substantial quantity of fines.

9. The method of producing granular calcium hypochlorite which comprises crushing substantially dry curved chips and aggregates of curved chips of calcium hypochlorite between continuous surfaces of yieldable material rotating at substantially the same peripheral speed under a pressure sufficient to break the chips but insufficient to produce a substantial quantity of fines.

10. The method of producing granular calcium hypochlorite which comprises crushing substantially dry curved chips of calcium hypochlorite between rubber covered rolls rotating at substantially the same peripheral speed under a pressure sufficient to break the chips but insufficient to produce a substantial quantity of fines.

11. The method of producing granular calcium hypochlorite which comprises crushing substantially dry curved chips of calcium hypochlorite between rubber covered rolls, the rubber having a durometer test of from 40 to 70 units, said rolls rotating at substantially the same peripheral speed under a pressure sufficient to break the chips but insufficient to produce a substantial quantity of fines.

HOMER LOUIS ROBSON.
HAROLD DORMAN KAUFMANN.